US009320287B2

(12) United States Patent
Peters et al.

(10) Patent No.: US 9,320,287 B2
(45) Date of Patent: *Apr. 26, 2016

(54) SYSTEM AND METHOD FOR HARVESTING SADDLE MEAT FROM A CARCASS PART OF SLAUGHTERED POULTRY

(71) Applicant: MAREL STORK POULTRY PROCESSING B.V., Boxmeer (NL)

(72) Inventors: Erik Hendrikus Werner Peters, Boxmeer (NL); Petrus Christianus Hendrikus Janssen, Wilbertoord (NL); Roger Pierre Hubertus Maria Claessens, Nijmegen (NL)

(73) Assignee: Marel Stork Poultry Processing B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,211

(22) Filed: Jul. 10, 2015

(65) Prior Publication Data

US 2015/0313246 A1      Nov. 5, 2015

Related U.S. Application Data

(63) Continuation of application No. 14/436,560, filed as application No. PCT/NL2013/050713 on Oct. 9, 2013.

(30) Foreign Application Priority Data

Oct. 17, 2012   (NL) ..................................... 2009646

(51) Int. Cl.
*A22C 21/00*    (2006.01)
(52) U.S. Cl.
CPC ......... *A22C 21/0023* (2013.01); *A22C 21/0053* (2013.01); *A22C 21/0069* (2013.01)
(58) Field of Classification Search
CPC ........ A22C 17/00; A22C 17/04; A22C 18/00; A22C 21/00; A22C 21/0023; A22C 21/003; A22C 21/0069
USPC .................. 452/149–153, 155, 156, 163, 165
See application file for complete search history.

(56) References Cited

U.S. PATENT DOCUMENTS

| 4,639,973 | A | * | 2/1987 | van der Eerden ...... A22C 21/00 452/167 |
| 4,935,990 | A | * | 6/1990 | Linnenbank ....... A22C 21/0023 452/167 |

(Continued)

FOREIGN PATENT DOCUMENTS

| EP | 0459580 A1 | 12/1991 |
| WO | 2014062053 A1 | 4/2014 |
| WO | 2014062054 A1 | 4/2014 |

OTHER PUBLICATIONS

International Patent Application No. PCT/NL2013/050713, International Search Report and Written Opinion, mailed Jan. 1, 2014, 9 pages.

(Continued)

*Primary Examiner* — Richard Price, Jr.
(74) *Attorney, Agent, or Firm* — Kilpatrick Townsend & Stockton LLP (57) ABSTRACT

The invention pertains to a method and system for harvesting saddle meat parts from a carcass part of slaughtered poultry, wherein the carcass part initially comprises two legs parts and a saddle, wherein the carcass part further comprises two saddle meat parts.
The method comprises the following steps:
  separating the leg parts from the saddle meat parts and the saddle, leaving the saddle meat parts connected to the saddle,
  arranging the saddle in a saddle meat harvester,
  making the saddle meat parts come to extend from the carcass part, while the saddle meat parts remain connected to the saddle,
  positioning the tissue connection between the left saddle meat part and the saddle in alignment with a left cutter and positioning the tissue connection between the right saddle meat part and the saddle in alignment with a right cutter,
  moving the saddle with the saddle meat parts towards the left cutter and right cutter, and during this moving, providing a resistance force to the saddle meat parts such that the tissue connections between the saddle meat parts and the saddle become taut,
  separating the saddle meat parts from the saddle, said separation being initiated while the tissue connections between the saddle meat parts and the saddle are taut,
  collecting the separated saddle meat parts.

24 Claims, 5 Drawing Sheets

(56) References Cited

U.S. PATENT DOCUMENTS

| | | | |
|---|---|---|---|
| 5,035,673 A * | 7/1991 | Hazenbroek | A22C 21/0023 452/149 |
| 5,045,022 A * | 9/1991 | Hazenbroek | A22C 21/0069 452/165 |
| 5,176,563 A | 1/1993 | van den Nieuwelaar et al. | |
| 5,188,559 A | 2/1993 | Hazenbroek | |
| 5,194,035 A | 3/1993 | Dillard | |
| 5,312,291 A * | 5/1994 | van den Nieuwelaar | A22C 21/0053 452/165 |
| 5,336,127 A * | 8/1994 | Hazenbroek | A22C 21/0023 452/160 |
| 5,407,383 A * | 4/1995 | Diesing | A22C 21/0023 452/165 |
| 5,429,549 A * | 7/1995 | Verrijp | A22C 21/0023 452/154 |
| 5,713,787 A | 2/1998 | Schoenmakers et al. | |
| 6,004,199 A | 12/1999 | Habenicht et al. | |
| 6,312,326 B1 | 11/2001 | van den Nieuwelaar et al. | |
| 6,322,438 B1 | 11/2001 | Barendregt et al. | |
| 7,059,954 B2 | 6/2006 | Annema et al. | |
| 7,115,030 B2 | 10/2006 | van Hillo et al. | |
| 8,308,535 B2 * | 11/2012 | De Vos | A22C 21/0069 452/136 |
| 8,491,362 B2 | 7/2013 | Kodama et al. | |
| 8,834,237 B2 * | 9/2014 | Van Hillo | A22C 21/0023 452/167 |
| 2005/0059334 A1 | 3/2005 | Haley et al. | |
| 2015/0282496 A1 | 10/2015 | Peters et al. | |
| 2015/0296814 A1 | 10/2015 | Peters et al. | |

OTHER PUBLICATIONS

International Patent Application No. PCT/NL2013/050713, International Preliminary Report on Patentability, issued Apr. 21, 2015, 6 pages.

International Patent Application No. PCT/NL2013/050714, International Search Report and Written Opinion, mailed Jan. 16, 2014, 9 pages.

International Patent Application No. PCT/NL2013/050714, International Preliminary Report on Patentability, issued Apr. 21, 2015, 6 pages.

Netherlands Patent Application No. 2009646, Search Report dated Jul. 8, 2013 and English version of Written Opinion, 8 pages.

Netherlands Patent Application No. 2009647, Search Report dated Jul. 8, 2013 and English version of Written Opinion, 8 pages.

U.S. Appl. No. 14/436,560, Notice of Allowance, mailed Oct. 6, 2015, 10 pages.

U.S. Appl. No. 14/436,586, Notice of Allowance, mailed Oct. 5, 2015, 10 pages.

* cited by examiner

SYSTEM AND METHOD FOR HARVESTING SADDLE MEAT FROM A CARCASS PART OF SLAUGHTERED POULTRY

CROSS-REFERENCE TO RELATED APPLICATIONS

This patent application is a continuation of U.S. patent application Ser. No. 14/436,560, filed on Apr. 17, 2015, which is the U.S. national phase of International Application No. PCT/NL2013/050713, filed on Oct. 9, 2013 and published in English on Apr. 24, 2014 as International Publication No. WO 2014/062053 A1, which application claims priority to Netherlands Patent Application No. 2009646, filed on Oct. 17, 2012, the contents of all of which are incorporated herein by reference.

FIELD

The invention pertains to a system and method for harvesting saddle meat from a carcass part of slaughtered poultry.

BACKGROUND

When leg parts are harvested from a carcass part of slaughtered poultry, e.g. from a back half of slaughtered poultry, the so called saddle of the carcass part remains. The saddle is generally speaking the part between the hip joints, optionally with a small piece of the lower back. The saddle has some meat attached to it, but this is hard to harvest, in particular hard to harvest in an automated way.

There has been a time when it was desired to harvest leg parts with as much skin and small, often ragged, meat parts attached to the legs as possible. The skin and small meat parts add to the weight of the leg parts, so leg parts could be sold at a relatively high price. In these type of methods, the ragged parts of meat and/or skin that remained attached to the leg parts after harvesting the leg parts are undefined and vary from leg part to leg part.

However, customer's desire has now changed to demanding leg parts that look good, are neatly trimmed and have no risk of bone splinters in them. This lead to the development of leg part harvesting machines that do an anatomic separation of the leg parts and the saddle. When doing an anatomic separation, body structures are separated from each other in such a way that the body structures themselves are kept intact as much as possible, rather than by cutting through the body structures. The anatomic separation involves dislocation of the hip joints.

For example, EP 0459580 describes such a method and system for anatomically separating leg parts from a saddle, e.g. starting from a back half. In the device and method of EP0459580, carcass parts such a back halves are brought to the device by an overhead conveyor that is provided with carriers. Each back half is suspended from a carrier; the carrier engages the back halves in the vicinity of the free ends of the leg parts.

When the back half has entered the device of EP0459580, a groin cut is made in the groin area between each leg part and the saddle. Then, a hip dislocating guide pushes the legs apart from each other. Due thereto, the leg parts become disengaged from the carrier of the overhead conveyor. The hip dislocating guide keeps on pushing the legs apart, to such an extent that the hip joints become dislocated and the leg parts come to hang down from the saddle instead of pointing upward, upward being their natural position.

A conveyor is provided in the device of EP0459580 that provides transport of the back halves when they are no longer carried by the carrier of the overhead conveyor. This conveyor engages the saddle.

After dislocation of the hip joints, an incision is made between each leg part and the saddle in the back region of the carcass part using a back cutter in such a way that after making the back incision, a tissue connection remains between the each leg part and the saddle part. The leg parts are therefore still connected to the saddle.

The back half is then conveyed further within the device by a spiked chain that engages the saddle. The back half is supported by a support guide during this movement.

Then, each leg part is gripped by a leg gripper. The leg gripper has a leg gripping slot for engaging a leg part and is moveable along a track that extends horizontally and parallel to the path followed by the saddle. Multiple leg grippers are mounted on an endless chain, of which the top flight runs parallel to the support guide for the saddle.

The leg grippers move at a higher velocity than the velocity at which the saddles are conveyed. So, when a leg gripper engages a leg part, the leg is moved faster than the saddles. This produces a pulling action that separates the leg parts from the saddle.

In the system and the method of EP0459580, the oysters are harvested together with the leg parts, which means that the oysters remain attached to the leg parts. The oysters are the parts of dark meat in the area where the legs are attached to the back meat in the vicinity of the spine. It is generally considered to be advantageous to harvest the oysters together with the leg parts.

On the other side of the leg, in the groin area, there is another piece of meat present that can be worth harvesting. These pieces of meat (two per back half) are called "saddle meat parts". These saddle meat parts comprise the oblique belly muscles (M. obliquus externus abdominis, M. obliquus internus abdominis) or parts thereof and/or muscle tissue in the direct vicinity thereof.

In current devices and methods for harvesting leg parts (e.g. as described in EP0459580) the saddle meat parts remain attached to the saddle. Often the saddle meat parts are thrown away with the saddle, or sometimes they harvested manually from the saddle. The manual harvesting of saddle meat parts is labour intensive and not very efficient.

However, the saddle meat parts are in themselves useful meat parts of rather good structure, so it is worth harvesting them. In particular in Asia, there now is a demand for those saddle meat parts, either separately or connected to the anatomically harvested leg parts.

SUMMARY

It is the aim of the device and method according to the invention to provide a way in which the saddle meat parts can be harvested separately or they are harvested together with the leg parts and for this harvesting to occur in a defined, purposive and automated way. If the saddle meat parts are harvested together with the leg parts, a saddle meat part remains attached to a harvested leg part.

This object is achieved with the method of claim 1 or 2 and the system of claim 9 or 10.

The invention encompasses two variants. In the first variant, the saddle meat parts are harvested as separate parts. In the second variant, the saddle meat parts are harvested together with the leg parts, with a saddle meat part remaining attached to a harvested leg part. Both variants of the invention provide a way in which the saddle meat parts can be harvested in a defined, purposive and automated way.

In the method according to both variants, the carcass part initially comprises two legs parts and a saddle, the leg parts being connected to the saddle via the hip joints, wherein the carcass part further comprises two saddle meat parts, which saddle meat parts are located in the groin area of the carcass part.

The method according to the invention in which the saddle meat parts are harvested as separate parts comprises the following steps:

separating the leg parts from the saddle meat parts and the saddle, leaving the saddle meat parts connected to the saddle, arranging the saddle in a saddle meat harvester, such that one saddle meat part is on the left side of the saddle and the other saddle meat part is on the right side of the saddle, making the saddle meat parts come to extend from the carcass part, while the saddle meat parts remain connected to the saddle on one side of the saddle meat part via a tissue connection, positioning the tissue connection between the left saddle meat part and the saddle in alignment with a left cutter and positioning the tissue connection between the right saddle meat part and the saddle in alignment with a right cutter, moving the saddle with the saddle meat parts towards the left cutter and right cutter, and during this moving, providing a resistance force to the saddle meat parts such that the tissue connections between the saddle meat parts and the saddle become taut, cutting through the tissue connection between the left saddle meat part and the saddle with the left cutter and cutting through the tissue connection between the right saddle meat part and the saddle with the right cutter, therewith separating the saddle meat parts from the saddle, said cutting being initiated while the tissue connections between the saddle meat parts and the saddle are taut, collecting the separated saddle meat parts.

The system according to the invention in which the saddle meat parts are harvested as separate parts comprises:

a leg parts harvester machine for separating the leg parts from the saddle meat parts and the saddle, leaving the saddle meat parts connected to the saddle, a saddle meat harvester for harvesting the saddle meat parts, which saddle meat harvester is adapted to receive the carcass parts with one saddle meat part on the left side of the saddle and the other saddle meat part on the right side of the saddle, which saddle meat harvester is arranged downstream of the leg parts harvester machine, which saddle meat harvester comprises:

an extension device for making the saddle meat parts come to extend from the carcass part, while said saddle meat parts remain connected to the saddle on one side of the saddle meat part via a tissue connection, a left cutter for cutting the tissue connection between the left saddle meat part and the saddle, and a right cutter for cutting the tissue connection between the right saddle meat part and the saddle, a left positioning guide for positioning the tissue connection between the left saddle meat part and the saddle in alignment with the left cutter and a right positioning guide for positioning the tissue connection between the right saddle meat part and the saddle in alignment with the right cutter, a carcass part conveyor for moving the carcass part with the saddle meat parts towards the left cutter and right cutter, a resistance element for providing a resistance force to the saddle meat parts during the conveying of the carcass part with the saddle meat parts by the carcass part conveyor, such that the tissue connections between the saddle meat parts and the saddle become taut, said resistance element being positioned relative to the left cutter and the right cutter such that the cutting of the tissue connections between the saddle meat parts and the saddle is initiated while the tissue connections between the saddle meat parts and the saddle are taut, a saddle meat receiving unit for collecting the separated saddle meat parts.

The method according to the invention in which the saddle meat parts are harvested together with the leg parts comprises the following steps:

arranging the carcass part in a saddle meat harvester, such that one saddle meat part is on the left side of the saddle and the other saddle meat part is on the right side of the saddle, making the saddle meat parts come to extend from the carcass part, while the saddle meat parts remain connected to the saddle on one side of the saddle meat part via a tissue connection, positioning the tissue connection between the left saddle meat part and the saddle in alignment with a left cutter and positioning the tissue connection between the right saddle meat part and the saddle in alignment with a right cutter, moving the carcass part with the saddle meat parts towards the left cutter and right cutter, and during this moving, providing a resistance force to the saddle meat parts such that the tissue connections between the saddle meat parts and the saddle become taut, cutting through the tissue connection between the left saddle meat part and the saddle with the left cutter and cutting through the tissue connection between the right saddle meat part and the saddle with the right cutter, therewith separating the saddle meat parts from the saddle but keeping the left saddle meat part attached to the left leg part and keeping the right saddle meat part attached to the right leg part, said cutting being initiated while the tissue connections between the saddle meat parts and the saddle are taut, separating the leg parts from the saddle while keeping the left saddle meat part attached to the left leg part and keeping the right saddle meat part attached to the right leg part collecting the separated leg parts with the saddle meat parts attached thereto.

The system according to the invention in which the saddle meat parts are harvested together with the leg parts comprises:

a saddle meat harvester for harvesting the saddle meat parts, which saddle meat harvester is adapted to receive the carcass parts with one saddle meat part on the left side of the saddle and the other saddle meat part on the right side of the saddle, which saddle meat harvester comprises:

an extension device for making the saddle meat parts come to extend from the carcass part, while said saddle remain connected to the saddle on one side of the saddle meat part via a tissue connection, a left positioning guide for positioning the tissue connection between the left saddle meat part and the saddle in alignment with the left cutter and a right positioning guide for positioning the tissue connection between the right saddle meat part and the saddle in alignment with the right cutter, a carcass part conveyor for moving the carcass part with the saddle meat parts towards the left cutter and right cutter, a resistance element for providing a resistance force to the saddle meat parts during the conveying of the carcass part with the saddle meat parts by the carcass part conveyor, such that the tissue connections between the saddle meat parts and the saddle become taut, said resistance element being positioned relative to the left cutter and the right cutter such that the cutting of the tissue connections between the saddle meat parts and the saddle is initiated while the tissue connections between the saddle meat parts and the saddle are taut, a leg parts harvester machine for separating the leg parts from the saddle while keeping the left saddle meat part attached to the left leg part and keeping the right saddle meat part attached to the right leg part, which leg parts harvester machine is arranged downstream from the saddle meat harvester, a leg parts receiving unit for collecting the separated leg parts with the saddle meat parts attached thereto.

A carcass part as processed in the method and system according to the invention is a back half or a part thereof. A back half comprises a saddle and two leg parts. The leg parts are connected to the saddle via the hip joints. The carcass part to be processed in the system and method according to the invention initially comprises two legs parts and a saddle, the leg parts being connected to the saddle via the hip joints. The carcass part further comprises two saddle meat parts, one the right side of the carcass part and one on the left side of the carcass part. Each saddle meat part initially is connected on one side to the saddle by means of a tissue connection.

The carcass part is arranged in the saddle meat harvester according to the invention in such a way that one saddle meat part is on the left side of the saddle and the other saddle meat part is on the right side of the saddle. The carcass part is conveyed through the saddle meat harvester by a carcass part conveyor.

It often occurs that initially, the saddle meat parts cling to the surface of the saddle or the surface of a leg part. In such a position, the saddle meat part cannot be harvested in an automated way. Therefore, the first step in the harvesting of the saddle meat part is to make the saddle meat parts come to extend from the rest of the saddle. This can for example be done by folding away the saddle meat parts away from the carcass part or by straightening or stretching the saddle meat parts. Right after the making the saddle meat parts become extended from the carcass part, the saddle meat parts are still attached to the saddle via the tissue connection.

Making the saddle meat parts become extended from the carcass part can be achieved practically in many ways. The system according to the invention comprises an extension device to make the saddle meat parts come to extend from the rest of the carcass part. This can be done by imposing a small movement on the saddle meat parts relative to the carcass part, merely creating a small distance between the surface of the saddle meat part and the surface of the carcass part to which it clung. Alternatively, a larger movement can be imposed on the saddle meat parts relative to the rest of the carcass part, creating more distance between the surface of the saddle meat part and the surface of the carcass part to which it clung or even making the saddle meat part come to extend perpendicular to the saddle.

Often, the extension device will comprise extension elements, for example a left extension element for making the left saddle meat part come to extend from the rest of the carcass part and a right extension element for making the right saddle meat part come to extend from the rest of the carcass part.

The extension device can for example comprise a left extension element in the form of a left extension guide and a right extension element in the form of a right extension guide. The carcass part is moved relative to the left extension guide and right extension guide in such a way that the extension guides become positioned between the saddle meat part and the surface of the carcass part that the saddle meat part clings to. Therewith, as the carcass part passes the left extension guide and right extension guide, these guides move, e.g. fold, the saddle meat parts away from the carcass part.

Alternatively or in addition, the extension device can comprise extension elements in the form of two rollers, which are preferably provided with a helical profile. One roller will be positioned such that it engages the left saddle meat part and the other roller will be positioned such that it engages the right saddle meat part. The rollers are rotatable around their longitudinal axis in order make the saddle meat parts come to extend, e.g. fold away, from the rest of the carcass part.

Alternatively or in addition, the extension device can comprise extension elements in the form of one or more brushes, for example rotating brushes for engaging the saddle meat parts and making them come to extend from the rest of the carcass part.

In a different approach, the extension device is a device that positions the carcass part in such a way that the saddle meat parts come to hang downward from the rest of the carcass part. In this embodiment, gravity makes the saddle meat parts come to extend from the rest of the carcass part. In general this will imply flipping over the saddle.

So, for example the saddle meat parts can be made come to extend from the carcass part by a extension guide or by extension rollers or by brushes or under the influence of gravity.

Optionally, the extension elements are horizontal guide plates and/or rollers, for example rollers with a helical profile on their surface, or brushes.

The system according to the invention further comprises a left cutter and an right cutter. The left cutter is adapted for cutting the tissue connection between the left saddle meat part and the saddle. The right cutter is adapted for cutting the tissue connection between the right saddle meat part and the saddle. By this cutting, the saddle meat parts get separated from the saddle.

The cutters can be for example disc shaped, rotating knifes or stationary blades.

Before the saddle meat parts can be separated from the rest of the carcass part, they have to be positioned relative to the cutters. Once the saddle meat parts no longer cling to the saddle and/or the leg parts, they can be brought into a suitable position for cutting. In particular the tissue connections between the saddle meat parts and the saddle need to be positioned relative to the cutters that will separate the saddle meat parts from the saddle. This positioning is done by a left positioning guide and a right positioning guide. The left positioning guide positions the tissue connection between the left saddle meat part and the saddle. The right positioning guide positions the tissue connection between the right saddle meat part and the saddle.

The system according to the invention comprises a carcass part conveyor that is adapted to move the carcass part with the saddle meat parts to the cutters. When the leg parts have been removed from the carcass part before the saddle meat parts are harvested, this conveyor moves the saddles with the saddle meat parts to the cutters. Optionally, this carcass part conveyor also moves the carcass part (or the saddle, in case the leg parts have already been removed) along the positioning guides.

Optionally, the positioning guides are vertical guide plates.

Optionally, the positioning guides have an inclined part in their upstream side. This inclined part optionally extends at least partially under the extension element of the extension device.

When the saddle conveyor moves the saddle past the extension element of the extension device, the inclined part of the positioning guide comes beneath the tissue connection that connects the saddle meat parts to the rest of the saddle. This of course happens both on the left side and on the right side.

Optionally, the system further comprises a support guide for supporting the saddle meat parts during the cutting of the tissue connection between the saddle meat parts and the saddle. This support guide preferably comprises a left support guide part and a right support guide part, the left support guide part being adapted to support the left saddle meat part during the cutting and the right support guide part being adapted to support the right saddle meat part during the cutting. So, optionally the saddle meat parts are supported by a support guide during the cutting of the tissue connection between the saddle meat parts and the saddle.

Optionally, the support guide parts have a straight part, downstream of the positioning guides. The straight part engages saddle meat part adjacent to the tissue connection that connects the saddle meat parts to the rest of the saddle from below. The saddle meat part extends outward over the support guide, the rest of the saddle is conveyed between the left support guide part and the right support guide part.

Optionally the left positioning guide is connected to the left support guide part and the right positioning guide is connected to the right support guide part.

Optionally, the left positioning guide and the left support guide part are integrated into a single left guide plate. Optionally, the right positioning guide and the right support guide part are integrated into a single right guide plate.

Optionally, the left cutter extends below the top of the left support guide part and/or the right cutter extends below the top of the right support guide part. In such an embodiment, it is advantageous if the left support guide part and the right support guide part are provided with an opening that prevents the building up of tissue scraps in the vicinity of the cutter.

Optionally, the support guide comprises vertical guide plates.

The system according to the invention further comprises a resistance element for providing a resistance force to the saddle meat parts during the conveying of the saddle by the saddle conveyor. The resistance force is directed opposite to the direction in which the carcass parts are conveyed, so that the saddle meat parts experience a force that tries to make them drag behind the saddle part. The resistance element makes that the tissue connections between the saddle meat parts and the saddle become taut. The resistance element is positioned relative to the left cutter and the right cutter such that the cutting of the tissue connections between the saddle meat parts and the saddle is initiated while the tissue connections between the saddle meat parts and the saddle are held taut by the resistance element.

The resistance element can take many forms. For example, the extension element and the positioning guides can be arranged relative to each other that both on the left side and on the right side, a slot is present between the positioning guide and the extension element (e.g. an extension guide), which slot is narrower than the expected thickness of the saddle meat parts in the area that is engaged by the positioning guide. By guiding the saddle meat parts through this slot, the positioning guide and/or the extension element apply additional friction to the saddle meat part. This additional friction provides the resistance force. As the carcass part conveyor keeps conveying the carcass part towards the cutters, the tissue connections between the saddle meat parts and the saddle become taut. Alternatively or in addition, such a slot can be present between the extension guide and the support guide if a support guide is present. So, optionally, the resistance element is a slot between the positioning guide and the extension guide and/or between the extension guide and the support guide if a support guide is present, which slot is narrower than the expected thickness of the saddle meat parts in the area that is engaged by the positioning guide.

So, optionally the resistance force on a saddle meat part is obtained by moving the saddle meat parts through a slot between the positioning guide and the extension guide and/or between the extension guide and the support guide if a support guide is present, which slot is narrower than the expected thickness of the saddle meat parts in the area that is engaged by the positioning guide.

Alternatively or in addition the resistance element can be an elastic element. Optionally the elastic element is adapted to push the saddle meat part against the positioning guide and/or the extension guide and/or the support guide. So, optionally the resistance force on a saddle meat part is obtained by an elastic element. Optionally the elastic element pushes the saddle meat part against the positioning guide and/or the extension guide and/or the support guide.

The system according to the invention further comprises a leg parts harvester machine.

In a possible embodiment of the system and method according to the invention, the carcass part is conveyed through the leg parts harvester machine and through the saddle meat machine by one single conveyor. Optionally, the leg parts harvester machine comprises a carcass part conveyor which is adapted to convey the carcass parts through the leg parts harvester machine, which carcass part conveyor extends into the saddle meat harvester such that said carcass part conveyor conveys the carcass parts through the saddle meat harvester.

So, in a possible embodiment of the method according to the invention, the legs parts are separated from the saddle in a leg parts harvester machine, in which leg parts harvester machine the carcass parts are conveyed by a carcass part conveyor, which carcass part conveyor also conveys the carcass parts through the saddle meat harvester.

Alternatively, the leg parts harvester machine and the saddle meat harvester each have their own separate carcass part conveyor.

In a possible embodiment, the leg parts harvester machine and the saddle meat harvester are connected to each other, or even integrated into one other. It is possible that the saddle meat harvester is arranged in the leg parts harvester machine in such a way that some of the process steps of harvesting the legs are performed on the carcass part before it reaches the saddle meat harvester, and other process steps of harvesting the legs are performed on the carcass part after it has left the saddle meat harvester.

In an advantageous embodiment of the system according to the invention, the leg parts harvester machine is adapted to separate the leg parts from the saddle in an anatomic way. In a possible embodiment of the method according to the invention, the leg parts are separated from the saddle in an anatomic way.

In a possible embodiment, the leg parts harvester machine is a device according to EP0459580.

In a possible embodiment of the system according to the invention, the system further comprises a main conveyor, which main conveyor comprises a plurality of carriers, each carrier being adapted to engage a carcass parts by or in the vicinity of the free ends of the leg parts in such a way that the carcass part is suspended from the carrier with the free ends of the leg parts pointing upward, the main conveyor being provided with a drive for moving the carriers along a path.

In this embodiment of the system according to the invention, the system optionally further comprises:
- in the leg parts harvester machine, a hip dislocator assembly, which is adapted to dislocate the hip joints in such a way that after said dislocation, a tissue connection remains between each leg part and the saddle, and adapted to disengage the leg parts from the carrier of the main conveyor such that the free ends of the leg parts come to point downward,
- in the leg parts harvester machine, a saddle support guide, which is adapted for supporting the saddle of the carcass part after the carcass part has become disengaged from the carrier of the main conveyor,
- in the leg parts harvester machine, a leg separator comprising two leg grippers, each leg gripper comprising a leg gripping slot that is adapted for engaging a leg part, In this embodiment, the leg grippers are adapted to induce a pulling movement of the leg parts relative to the saddle, thereby tearing loose the tissue connection between each leg part and the saddle such that the leg parts are separated from the saddle, the leg separator being arranged relative to the saddle support guide such that the saddle support guide supports the saddle during the gripping and pulling of the leg parts.

Preferably, the leg parts are pulled downward during the separation of the legs parts from the saddle.

In a corresponding embodiment of the method according to the invention, the method further comprises the following steps:
- conveying the carcass parts along a path in a main conveyor, which main conveyor comprises a plurality of carriers, a carrier engaging a carcass parts by or in the vicinity of the free ends of the leg parts in such a way that the carcass part is suspended from the carrier with the free ends of the leg parts pointing upward,
- dislocating the hip joints such that a tissue connection remains between each leg part and the saddle,
- disengaging the leg parts from the carrier of the main conveyor, thereby making the free ends of the leg parts point downward,
- after disengaging the leg parts from the carrier of the main conveyor, supporting the saddle,
- gripping each leg part using a leg separator with a leg gripper, each leg gripper having a leg gripping slot for engaging a leg part,
- separating the leg parts from the saddle by exerting a pulling movement on the leg parts relative to the saddle, thereby tearing loose the tissue connection between each leg part and the saddle such that the leg parts become separated from the saddle, Optionally, the pulling of the leg parts away from the saddle such that the leg parts are separated from the saddle is a downward pulling.

Optionally, the system and method according to the invention are adapted to process is a back half. In such an embodiment, the system preferably comprises an overhead conveyor comprising a plurality of carriers, each carrier being adapted to engage the leg parts of a back half, such that the back half becomes suspended from the carrier, the carriers being moveable along a track.

Preferably, in such a system the leg parts harvester machine comprises:
- a disengaging guide, which is adapted to disengage the leg parts of the back half from the carrier of the overhead conveyor, such that the back half is no longer carried by the carrier of the overhead conveyor,
- a saddle conveyor, which is adapted to engage the saddle of the back half and convey it through at least the leg parts harvester machine, optionally also through the saddle meat harvester,
- a groin cutter which is adapted to make an incision in the groin area of the back half between each leg part and the saddle, such that the saddle meat parts remain connected to the saddle,
- a hip dislocating guide which is adapted to dislocate the hip joints,
- a back cutter which is adapted to make an incision between each leg part and the saddle in the back region of the carcass part in such a way that after making the back incision, a tissue connection remains between the each leg part and the saddle part,
- a leg parts separator, which is adapted to pull the leg parts away from the saddle such that the leg parts are separated from the saddle, in such a way that the saddle meat parts remain connected to the left side and/or right side of the saddle.

Optionally, in such a system, the leg parts separator is arranged such that the pulling of the leg parts in order to separate them from the saddle is a downward pulling.

In a corresponding embodiment of the method according to the invention, the method further comprises the following steps:
- arranging the back half in a carrier of an overhead conveyor such that the back half is suspended from the carrier, the carrier engaging the carcass part by the leg parts such that the leg parts point upward,
- conveying the back half by the overhead conveyor to a leg parts harvester machine,
- in the leg parts harvester machine, disengaging the back half from the carrier of the overhead conveyor and conveying the back half further through the leg parts harvester machine by a saddle conveyor,
- in the leg parts harvester machine, making an incision in the groin area of the back half between each leg part and the saddle, such that the saddle meat parts remain connected to the saddle,
- in the leg parts harvester machine, dislocating the hip joints,
- in the leg parts harvester machine, making an incision between each leg part and the saddle in the back region of the carcass part using a back cutter in such a way that after making the back incision, a tissue connection remains between the each leg part and the saddle part,
- in the leg parts harvester machine, pulling the leg parts away from the saddle such that the leg parts are separated from the saddle, in such a way that the saddle meat parts remain connected to the left side and/or right side of the saddle, the oysters preferably remaining attached to the leg parts, conveying the saddle by the saddle conveyor to a saddle meat harvester machine.

Optionally, the pulling of the leg parts away from the saddle such that the leg parts are separated from the saddle is a downward pulling.

The separated saddle meat parts or the leg parts with the saddle meat parts attached thereto are collected after they are separated from the rest of the carcass part. The separated saddle meat parts are collected in a saddle meat receiving unit. The separated leg parts with the saddle meats parts attached thereto are collected in a leg parts receiving unit.

Optionally, the saddle meat receiving unit is a conveyor belt or a container, the conveyor belt or the container, respectively, being arranged below the saddle meat harvester.

Optionally, the leg parts receiving unit is a conveyor belt or a container, the conveyor belt or the container, respectively, being arranged below the leg separator of the leg parts harvester machine.

So, optionally, the separated saddle meat parts or the separated leg parts with the saddle meat parts attached thereto are collected on a conveyor belt or in a container, the conveyor belt or the container, respectively, being arranged below the saddle meat harvester or below the leg separator of the leg parts harvester machine.

In a possible embodiment, the saddle meat harvester comprises a central axis that extends along the centre of the conveying path that carcass part, or at least the saddle thereof, follows through the saddle meat harvester, wherein the extension device, and/or the support guide and/or the left cutter and the right cutter, and/or the resistance element, respectively, are arranged symmetrically relative to a vertical plane extending through said central axis.

Optionally, the saddle meat parts on both sides of the saddle are separated from the saddle substantially simultaneously or simultaneously.

Optionally, the harvested leg parts comprise oyster meat.

BRIEF DESCRIPTION OF THE FIGURES

The invention will be described in more detail below under reference to the drawing, in which in a non-limiting manner exemplary embodiments of the invention will be shown.

The drawing shows in.

DETAILED DESCRIPTION

Figure 1:
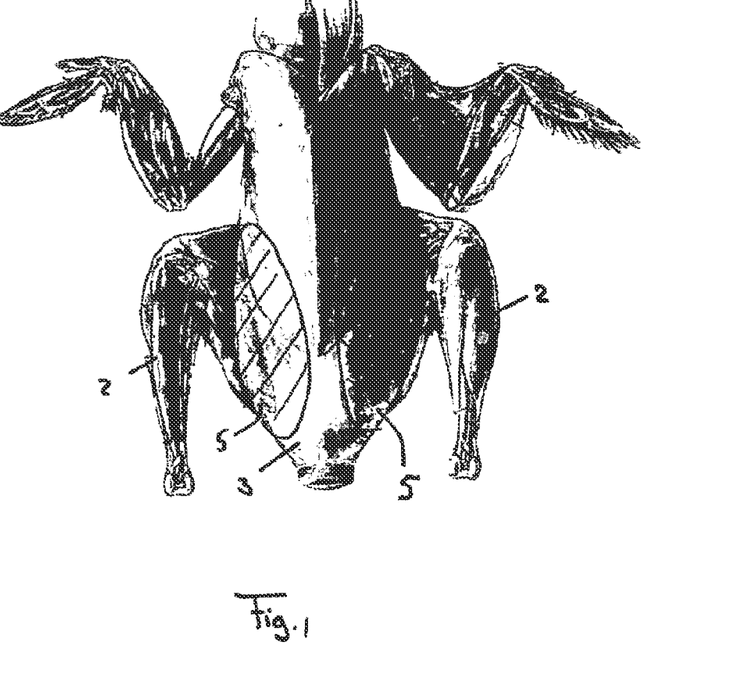
FIG. 1: a view of the muscle structure of a chicken, seen from the ventral side.

FIG. 1 shows the muscle structure of a chicken, seen from the ventral side. The leg parts 2 are indicated, as well as the saddle 3. The saddle meat parts 5 located within the hatched areas as shown in FIG. 1. The saddle meat parts are different meat parts than the oyster meat or oysters that is/are sometimes mentioned in the prior art in relation to the harvesting of leg parts. The oyster meat or oysters is/are located on the dorsal side of the carcass, while the saddle meat parts are located on the ventral side of the carcass.

Figure 2:
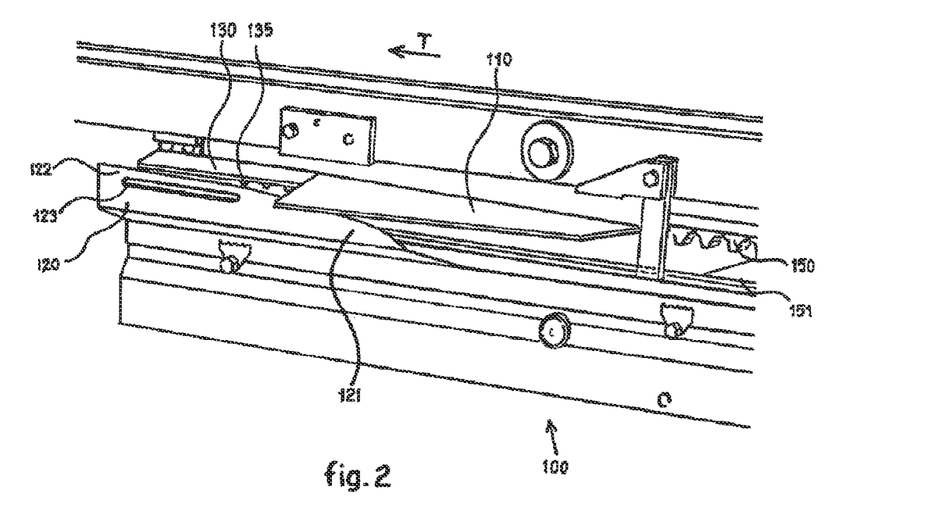
FIG. 2: a detail of the left hand side of the saddle meat harvester.

FIG. 2 shows a detail of the left hand side of saddle meat harvester 100. In FIG. 2, arrow T indicates the general direction of transport of the saddles 3 or carcass parts such as back halves through the saddle meat harvester 100. Carcass part conveyor 150 conveys the saddles 3 or carcass parts through the saddle meat harvester. In this embodiment, the carcass part conveyor is a spiked chain that engages the saddle (or engages the carcass part by the saddle) from above. Below the saddle, a beam-like support 151 has been provided that supports the saddle or the carcass part while it is conveyed through the saddle meat harvester.

FIG. 2 further shows an extension device. In the embodiment of FIG. 2, the extension device comprises a left extension guide 110 and a right extension guide (not shown). The shape and position of the right extension guide are the same as those of the left extension guide 110, only mirrored in a plane of symmetry that extends vertically through the central longitudinal axis of the carcass part conveyor 151.

The extension guides 110 are horizontal, stationary guide plates that are positioned at such a height above the beam-like support 151 that they engage any saddle meat parts that cling to the rest of the carcass part, either to the saddle or to the leg parts (if leg parts are still present). As the extension guides 110 gradually extend outward in downstream directions (seen in the direction of transport T), they bring the saddle meat parts in a position in which they extend from the rest of the carcass part and no longer cling to the rest of the carcass part.

Below the left extension guide 110, left positioning guide 121 is arranged. On the right side of the saddle meat harvester 100, a right positioning guide (not shown) has been arranged. The shape and position of the right positioning guide are the same as those of the left positioning guide 121, only mirrored in a plane of symmetry that extends vertically through the central axis longitudinal axis of the carcass part conveyor 151. The positioning guides 121 are vertical, stationary guide plates.

The part of positioning guide 121 that engages the saddle meat part is inclined relative to the path along which the carcass part conveyor 150 conveys the carcass parts or saddles. The positioning guides 121 extend partly below the extension guides 110.

The positioning guides 121 engage the saddle meat parts from below and position the saddle meat parts in preparation for their separation from the saddle.

Downstream of the positioning guides 121, support guides 122 are arranged. These support guides are again present on the left side as well on the right side of the saddle meat harvester. The support guides 122 support the saddle meat parts during the cutting of the tissue connection between the saddle meat parts and the saddle.

Like the positioning guides 121, the support guides 122 are vertical, stationary guide plates. Optionally, the left positioning guide and the left support guide are integrated into single left guide plate 120. The same can optionally be done with the right positioning guide and the right support guide.

Optionally, an opening 123 is present in each support guide 122 in order to prevent scraps of meat and other tissue building up on the inside of the support guide 122 due to the cutting of the tissue connection between the saddle meat parts and the saddle.

In the embodiment of FIG. 2, the extension guide 110 has been extended in downstream direction with guide part 130. Guide part 130 preferably is present on the left side and as well as on the right side of the saddle meat harvester.

In the embodiment of FIG. 2 a slot 135 extends between the extension guide 110 (including guide part 130) on the one hand and the positioning guide 121 and support guide 122 on the other hand. This slot 135 comprises a part that is narrower than the expected thickness of the saddle meat part in the area in which it is supported by the positioning guide and/or the support guide. Due to this, the extension guide 110,130, the positioning guide 121 and the support guide 122 exert additional friction on the saddle meat part, therewith providing a resistance force, making the slot function as a resistance element. As the carcass part conveyor 150 continues to convey the carcass part or saddle, the tissue connection between the saddle meat part and the saddle becomes taut. This makes it easier to cut this tissue connection through and separate the saddle meat parts from the saddle.

The slot 135 is present on the left side of the saddle meat harvester and on the right side of the saddle meat harvester.

Figure 3:
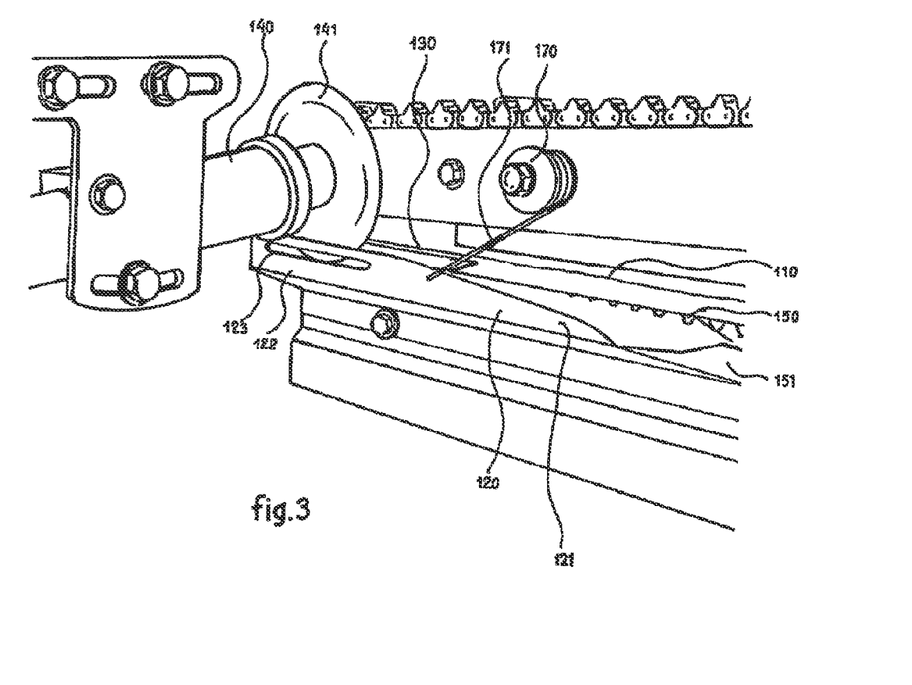
FIG. 3: the left hand side of the saddle meat harvester including the left cutter.

FIG. 3 shows the left hand side of the saddle meat harvester machine 100 including the left cutter 140. A similar cutter is present on the right side of the saddle meat harvester.

In the embodiment of FIG. 3, the left cutter 140 comprises a rotatable, disc-shaped knife 141. The lower part of the rotary blade extends below the top edge of the support guide 122, adjacent to the slit 123.

The extension guide 110 with guide part 130, the positioning guide 121, the support guide 122 with the opening 123, the beam-like support 151 and the carcass part conveyor 150 are all the same as in the embodiment of FIG. 2.

It can be seen in FIG. 3 that in this embodiment, the disc-shaped knife 141 is arranged under an angle relative to the vertical. This way, the cutter 140 has good access to the tissue connection between the saddle meat part and the saddle.

In the embodiment of FIG. 3, the disc-shaped knife 141 extends into the slit 135 in the vicinity of the support guide 122.

The embodiment of FIG. 3 has been provided with two additional resistance elements 170, one on the left side and one on the right side of the saddle meat harvester. Each resistance element comprises an elastic element in the form of a rod 171 that is mounted in an elastic way to the frame of the saddle meat harvester. The rod 171 engages the outside surface of the positioning guide 121.

When a carcass part is moved towards the cutters 140 by the carcass part conveyor 150, the extension guides 110 fold the saddle meat parts away from the saddle, outward relative to the carcass part or saddle. The positioning guide 121 picks up the saddle meat part from below as the carcass part is moved further towards the cutters 140. The saddle meat part now comes to lie against the outside surface on the side of the positioning guide 121. Once the saddle meat part reaches the rod 171 of the resistance element 170, the saddle meat part is forced between the rod 171 and the side surface of the positioning guide 121. The rod 171 exerts a resistance force on the saddle meat part, pushing it against the side surface of the positioning guide 121. This creates additional friction on the saddle meat part, which additional friction provides the resistance force.

Meanwhile the carcass part is moved further towards the cutters 140 by the carcass part conveyor 150. This makes that the tissue connection between the saddle meat parts and the saddle becomes taut, so it can be cut more easily.

Figure 4:
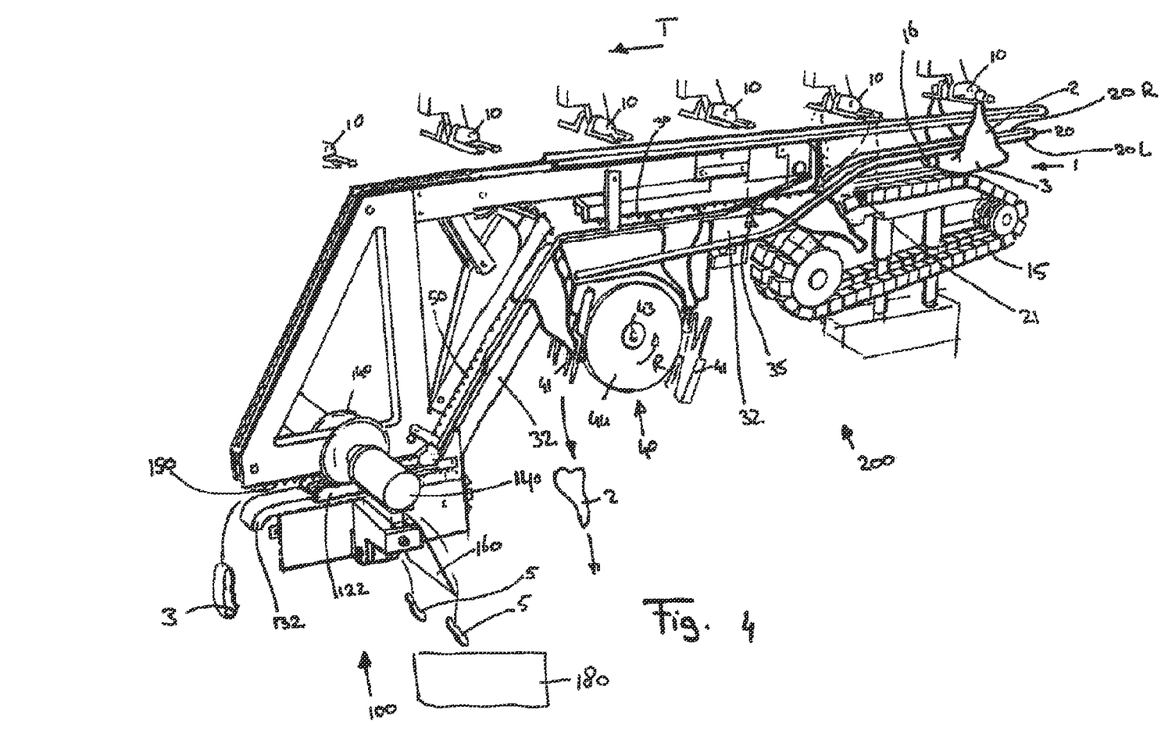
FIG. 4: an overview of a first embodiment of the system according to the invention.

FIG. 4 shows an overview of a first embodiment of the system according to the invention, with carriers 10 of an overhead conveyor, a leg parts harvester machine 200 and a saddle meat harvester 100. A back half 1 with leg parts 2 and a saddle 3 is suspended from a carrier 10, which carrier 10 engages the leg parts of the back half. The main direction of transport of the back halves through the system is indicated by arrow T.

The overhead conveyor brings the back half to the leg parts harvester machine 200.

The leg parts harvester machine 200 comprises a guide 20 that has a left side (as seen in the direction of transport) 20L and a right side (as seen in the direction of transport) 20R. The left side 20L of the guide 20 engages the left leg part and the right side 20R of the guide 20 engages the right leg part.

The guide 20 widens and inclines downward in area 21. In the first, most upstream part of area 21 of the guide 20, the guide 20 acts as a disengaging guide. It disengages the leg parts 2 of the back half 1 from the carrier 10 of the overhead conveyor, such that the back half 1 is no longer carried by the carrier 10 of the overhead conveyor.

The leg parts harvester machine further comprises a saddle conveyor, which is adapted to engage the saddle of the back half and convey it through at least the leg parts harvester machine, optionally also through the saddle meat harvester machine. In this embodiment, the saddle conveyor is a set of multiple conveying devices: the support conveyor 15, the first saddle conveyor 30 and the second saddle conveyor 50.

The support conveyor 15 supports the saddle when the incisions in the groin area and/or the back area of the back half 1 are made.

The first saddle conveyor 30 comprises a chain with protrusions that engages the saddle 3 from above. Underneath the first saddle conveyor, saddle support guide 32 extends. The saddle support guide 32 supports the saddle 3 from below while it is transported by the first saddle conveyor 30.

In the embodiment of FIG. 4, the first saddle conveyor 30 and the saddle support guide 32 have their upstream end near the disengaging guide. It is however possible as an alternative, that no support conveyor 15 is present, and instead the first saddle conveyor 30 and the saddle support guide 32 extend all the way from the point where the back halves enter the leg parts harvester machine.

The second saddle conveyor 50 is adapted to take part in the actual separation of the leg parts 2 from the saddle 3.

The leg parts harvester machine further comprises a groin cutter 16 which is adapted to make an incision in the groin area of the back half 1 between each leg part 2 and the saddle, 3 such that the saddle meat parts 5 remain connected to the saddle 3. In this embodiment, the groin cutter comprises a left blade, which is connected to the left part 20L of the guide 20 and a right blade, which is connected to the right part 20R of the guide 20.

The leg parts harvester machine further comprises a back cutter 35 which is adapted to make an incision between each leg part 2 and the saddle 3 in the back region of the back half. The back cutter 35 is used in such a way that after making the back incision, a tissue connection remains between the each leg part 2 and the saddle part 3.

The leg parts harvester machine further comprises a leg parts separator 40, which is adapted to pull the leg parts 2 away from the saddle 3 such that the leg parts 2 are separated from the saddle 3, in such a way that the saddle meat parts 5 remain connected to the left side and/or right side of the saddle 3, the oysters preferably remaining attached to the leg parts 2.

The leg parts separator 40, in the embodiment of FIG. 4, comprises a rotatable wheel 44 with two pairs of leg grippers 41 mounted thereon. The leg grippers 41 engage the leg parts 2 of a passing back half while the wheel 44 rotates about axis of rotating 43 in the direction of arrow R. The leg grippers 41 take the leg parts 2 of the back half with them along in their further rotation in the direction of arrow R, while the saddle 3 of that same back half is transported by the second saddle conveyor 50 and supported by saddle support guide 32.

The paths of the saddle 3 and the leg parts 2 diverge in the leg separator 40, and generally there will also be a difference in the conveying speed that the second saddle conveyor 50 imposes on the saddle 3 and the conveying speed that the leg grippers 41 impose on the leg parts 2. Generally, the speed of the leg parts 2 will be higher than the speed of the saddle 3. The diverging paths and the difference in speed result in a pulling force that is exerted on the leg parts 2. This pulling force causes the tissue that remained between the saddle 3 and the leg parts 2 after the incisions in the back region were made to tear. This results in a separation of the leg parts from the saddle. The saddle meat parts are still attached to the rest of the saddle at this moment. The oysters are preferably connected to the leg parts that are harvested.

The saddle is then conveyed further to and into the saddle meat harvester 100, which is only schematically shown in FIG. 4. The saddle meat harvester 100 is preferably of the type described in relation to FIG. 2 and FIG. 3.

In the embodiment of FIG. 4, the second saddle conveyor 50 of the leg parts harvester machine has been extended with a lower chain flight 150. This lower chain flight 150 conveys the saddles through the saddle meat harvester 100. During this conveying, the saddles 3 are supported by the saddle support guide 132 of the saddle meat harvester 100.

FIG. 4 schematically indicates the (left) support guide 122 and the left cutter 140. Also, a chute plate 160 for discharging the harvested saddle meat parts 5 is shown. The chute plate 160 guides the separated saddle meat parts to a saddle meat part receiving unit 180, such as a bin, a container or a conveyor belt.

Figure 5:
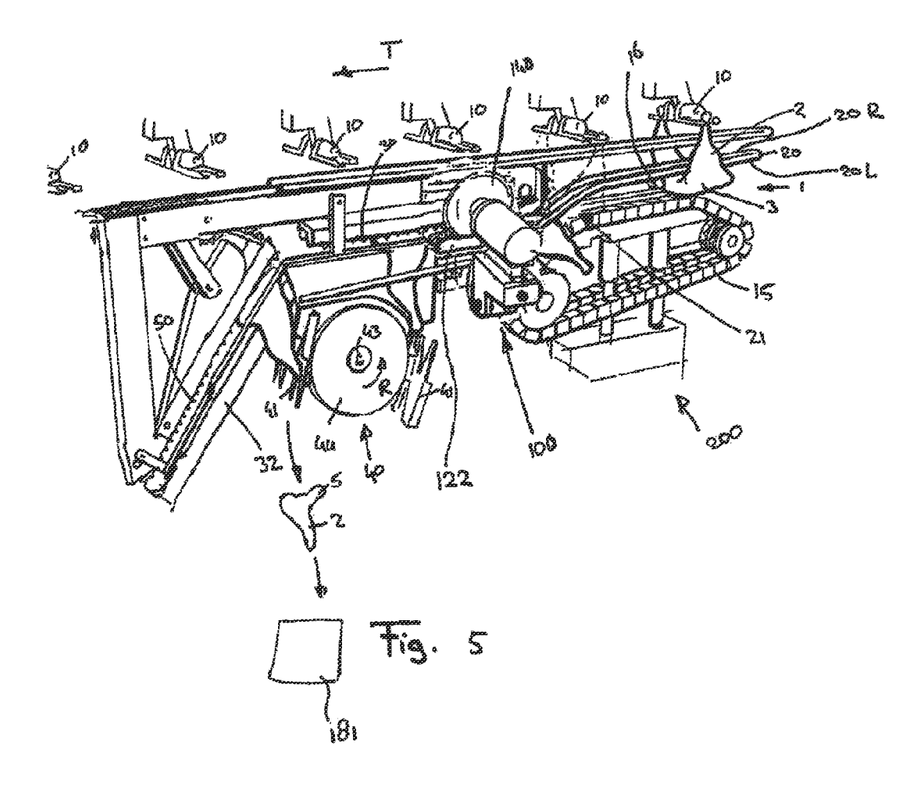
FIG. 5: an overview of a second embodiment of the system according to the invention

FIG. 5 shows a second embodiment of a system according to the invention. The leg parts harvester machine in the embodiment of FIG. 5 works in the same way as the leg parts harvester machine in the embodiment of FIG. 4.

However, in this embodiment the saddle meat harvester 100 is integrated into the leg parts harvester machine, and it is set up in such a way that the saddle meat parts 5 are harvested together with the leg parts 2.

In the embodiment of FIG. 5, the saddle meat harvester 100 is arranged such that some processing steps in the leg part harvesting process are carried out before the saddle meat parts are separated from the saddle, and some process steps in the leg part harvesting process are carried out after saddle meat parts are separated from the saddle. The saddle meat harvester separates the saddle meat parts from the saddle, but a tissue connection between each saddle meat part and a leg part remains.

In this embodiment, the saddle meat harvester is arranged just downstream of the groin cutter. However, other positions are possible as well. For example, alternatively the saddle meat harvester can be arranged entirely upstream of the leg parts harvester machine.

In the embodiment of FIG. 5, al leg parts receiving unit 181, such as a bin, a container or a conveyor belt, is present to collect the harvested leg parts with the saddle meat 5 attached to them, from the leg part harvester.

We claim:

1. Method for harvesting leg parts with saddle meat parts thereon from a carcass part of slaughtered poultry, which carcass part is a back half or a part thereof, wherein the carcass part initially comprises two legs parts and a saddle, the leg parts being connected to the saddle via the hip joints, wherein the carcass part further comprises two saddle meat parts, which saddle meat parts are located in the groin area of the carcass part, which method comprises:

arranging the carcass part in a saddle meat harvester, such that one saddle meat part is on the left side of the saddle and the other saddle meat part is on the right side of the saddle, making the saddle meat parts come to extend from the carcass part, while the saddle meat parts remain connected to the saddle on one side of the saddle meat part via a tissue connection, positioning the tissue connection between the left saddle meat part and the saddle in alignment with a left cutter and positioning the tissue connection between the right saddle meat part and the saddle in alignment with a right cutter, moving the carcass part with the saddle meat parts towards the left cutter and right cutter, and during this moving, providing a resistance force to the saddle meat parts such that the tissue connections between the saddle meat parts and the saddle become taut, cutting through the tissue connection between the left saddle meat part and the saddle with the left cutter and cutting through the tissue connection between the right saddle meat part and the saddle with the right cutter, therewith separating the saddle meat parts from the saddle but keeping the left saddle meat part attached to the left leg part and keeping the right saddle meat part attached to the right leg part, said cutting being initiated while the tissue connections between the saddle meat parts and the saddle are taut, separating the leg parts from the saddle while keeping the left saddle meat part attached to the left leg part and keeping the right saddle meat part attached to the right leg part, and collecting the separated leg parts with the saddle meat parts attached thereto.

2. Method according to claim 1, wherein the saddle meat parts come to extend from the carcass part by an extension guide or by extension rollers or by brushes or under the influence of gravity.

3. Method according to claim 2, wherein the saddle meat parts come to extend from the carcass part by said extension guide, wherein the tissue connection between the left saddle meat part and the saddle is positioned by a left positioning guide and the tissue connection between the right saddle meat part and the saddle is positioned by a right positioning guide, and wherein the resistance force on a saddle meat part is obtained by moving the saddle meat parts through a slot between each of the left and right positioning guides and the extension guide, which slot is narrower than the expected thickness of the saddle meat parts in the area that is engaged by the left and right positioning guides.

4. Method according to claim 2, wherein the saddle meat parts come to extend from the carcass part by an extension guide, wherein the saddle meat parts are supported by a support guide during the cutting of the tissue connection between the saddle meat parts and the saddle, and wherein the resistance force on a saddle meat part is obtained by moving the saddle meat parts through a slot between the extension guide and the support guide, which slot is narrower than the expected thickness of the saddle meat parts in the area that is engaged by the support guide.

5. Method according to claim 1, wherein the tissue connection between the left saddle meat part and the saddle is positioned by a left positioning guide and the tissue connection between the right saddle meat part and the saddle is positioned by a right positioning guide.

6. Method according to claim 1, wherein the saddle meat parts are supported by a support guide during the cutting of the tissue connection between the saddle meat parts and the saddle.

7. Method according to claim 1, wherein the resistance force on a saddle meat part is obtained by an elastic element.

8. Method according to claim 7, wherein the saddle meat parts come to extend from the carcass part by an extension guide, wherein the tissue connection between the left saddle meat part and the saddle is positioned by a left positioning guide and the tissue connection between the right saddle meat part and the saddle is positioned by a right positioning guide, and wherein the elastic element pushes the saddle meat part against at least one of the left positioning guide, the right positioning guide, and the extension guide.

9. Method according to claim 7, wherein the saddle meat parts come to extend from the carcass part by an extension guide, wherein the saddle meat parts are supported by a support guide during the cutting of the tissue connection between the saddle meat parts and the saddle, and wherein the elastic element pushes the saddle meat part against at least one of the support guide and the extension guide.

10. Method according to claim 1, wherein the method further comprises:
conveying the carcass parts along a path in a main conveyor, which main conveyor comprises a plurality of carriers, a carrier engaging a carcass parts by or in the vicinity of the free ends of the leg parts in such a way that the carcass part is suspended from the carrier with the free ends of the leg parts pointing upward,
dislocating the hip joints such that a tissue connection remains between each leg part and the saddle,
disengaging the leg parts from the carrier of the main conveyor, thereby making the free ends of the leg parts point downward,
after disengaging the leg parts from the carrier of the main conveyor, supporting the saddle,
gripping each leg part using a leg separator with a leg gripper, each leg gripper having a leg gripping slot for engaging a leg part, and
separating the leg parts from the saddle by exerting a pulling movement on the leg parts relative to the saddle, thereby tearing loose the tissue connection between each leg part and the saddle such that the leg parts become separated from the saddle.

11. Method according to claim 10, wherein exerting said pulling movement on the leg parts relative to the saddle is a downward pulling movement.

12. Method according to claim 1, wherein the carcass part to be processed is a back half, and wherein the method further comprises:
arranging the back half in a carrier of an overhead conveyor such that the back half is suspended from the carrier, the carrier engaging the carcass part by the leg parts such that the leg parts point upward,
conveying the back half by the overhead conveyor to a leg parts harvester machine,
in the leg parts harvester machine, disengaging the back half from the carrier of the overhead conveyor and conveying the back half further through the leg parts harvester machine by a saddle conveyor,
in the leg parts harvester machine, making an incision in the groin area of the back half between each leg part and the saddle, such that the saddle meat parts remain connected to the saddle,
in the leg parts harvester machine, dislocating the hip joints,
in the leg parts harvester machine, making an incision between each leg part and the saddle in the back region of the carcass part using a back cutter in such a way that after making the back incision, a tissue connection remains between the each leg part and the saddle part, and
in the leg parts harvester machine, pulling the leg parts away from the saddle such that the leg parts are separated from the saddle, in such a way that the saddle meat parts remain connected to the left side and/or right side of the saddle, the oysters preferably remaining attached to the leg parts, conveying the saddle by the saddle conveyor to a saddle meat harvester machine.

13. Method according to claim 12, wherein pulling the leg parts away from the saddle such that the leg parts are separated from the saddle is a downward pulling.

14. System for harvesting leg parts with saddle meat parts thereon from a carcass part of slaughtered poultry, which carcass part is a back half or a part thereof, wherein the carcass part initially comprises two legs parts and a saddle, the leg parts being connected to the saddle via the hip joints, wherein the carcass part further comprises two saddle meat parts, which saddle meat parts are located in the groin area of the carcass part, which system comprises:
a saddle meat harvester for harvesting the saddle meat parts, which saddle meat harvester is adapted to receive the carcass parts with one saddle meat part on the left side of the saddle and the other saddle meat part on the right side of the saddle, which saddle meat harvester comprises:
an extension device for making the saddle meat parts come to extend from the carcass part, while said saddle meat parts remain connected to the saddle on one side of the saddle meat part via a tissue connection,
a left cutter for cutting the tissue connection between the left saddle meat part and the saddle, and a right cutter for cutting the tissue connection between the right saddle meat part and the saddle,
a left positioning guide for positioning the tissue connection between the left saddle meat part and the saddle in alignment with the left cutter and a right positioning guide for positioning the tissue connection between the right saddle meat part and the saddle in alignment with the right cutter,
a carcass part conveyor for moving the carcass part with the saddle meat parts towards the left cutter and right cutter,
a resistance element for providing a resistance force to the saddle meat parts during the conveying of the carcass part with the saddle meat parts by the carcass part conveyor, such that the tissue connections between the saddle meat parts and the saddle become taut, and
said resistance element being positioned relative to the left cutter and the right cutter such that the cutting of the tissue connections between the saddle meat parts and the saddle is initiated while the tissue connections between the saddle meat parts and the saddle are taut,
a leg parts harvester machine for separating the leg parts from the saddle while keeping the left saddle meat part attached to the left leg part and keeping the right saddle meat part attached to the right leg part, which leg parts harvester machine is arranged downstream from the saddle meat harvester, and
a leg parts receiving unit for collecting the separated leg parts with the saddle meat parts attached thereto.

15. System according to claim 14, wherein the system further comprises a support guide for supporting the saddle meat parts during the cutting of the tissue connection between the saddle meat parts and the saddle, which support guide comprises a left support guide part and a right support guide part, the left support guide part being adapted to support the left saddle meat part during the cutting and the right support guide part being adapted to support the right saddle meat part during the cutting.

16. System according to claim 15, wherein the left positioning guide is connected to the left support guide part and the right positioning guide is connected to the right support guide part.

17. System according to claim 14, wherein the extension device is an extension guide, and wherein the resistance element is a slot between each of the left and right positioning guides and the extension guide, which slot is narrower than the expected thickness of the saddle meat parts in the area that is engaged by the left and right positioning guides.

18. System according to claim 14, wherein the extension device is an extension guide, and wherein the system further comprises a support guide for supporting the saddle meat parts during the cutting of the tissue connection between the saddle meat parts and the saddle, wherein the resistance element is a slot between the extension guide and the support guide, which slot is narrower than the expected thickness of the saddle meat parts in the area that is engaged by the support guide.

19. System according to claim 14, wherein the extension device is an extension guide, wherein the resistance element is an elastic element, and wherein the elastic element is adapted to push the saddle meat part against at least one of the left positioning guide, the right positioning guide, and the extension guide.

20. System according to claim 14, wherein the system further comprises a support guide for supporting the saddle meat parts during the cutting of the tissue connection between the saddle meat parts and the saddle, wherein the extension device is an extension guide, wherein the resistance element is an elastic element, and wherein the elastic element is adapted to push the saddle meat part against at least one of the support guide and the extension guide.

21. System according to claim 14, wherein the system further comprises:
- a main conveyor, which main conveyor comprises a plurality of carriers, each carrier being adapted to engage a carcass part by or in the vicinity of the free ends of the leg parts in such a way that the carcass part is suspended from the carrier with the free ends of the leg parts pointing upward, the main conveyor being provided with a drive for moving the carriers along a path,
- in the leg parts harvester machine, a hip dislocator assembly, which is adapted to dislocate the hip joints in such a way that after said dislocation, a tissue connection remains between each leg part and the saddle, and adapted to disengage the leg parts from the carrier of the main conveyor such that the free ends of the leg parts come to point downward,
- in the leg parts harvester machine, a saddle support guide, which is adapted for supporting the saddle of the carcass part after the carcass part has become disengaged from the carrier of the main conveyor,
- in the leg parts harvester machine, a leg separator comprising two leg grippers, each leg gripper comprising a leg gripping slot that is adapted for engaging a leg part, wherein the leg grippers are adapted to induce a pulling movement of the leg parts relative to the saddle, thereby tearing loose the tissue connection between each leg part and the saddle such that the leg parts are separated from the saddle, the leg separator being arranged relative to the saddle support guide such that the saddle support guide supports the saddle during the gripping and pulling of the leg parts.

22. System according to claim 21, wherein the leg separator is arranged such that the pulling movement of the leg parts relative to the saddle is a downward pulling movement.

23. System according to claim 14, wherein the carcass part to be processed is a back half and wherein the system further comprises:
- an overhead conveyor comprising a plurality of carriers, each carrier being adapted to engage the leg parts of a back half, such that the back half becomes suspended from the carrier, the carriers being moveable along a track, and wherein the leg parts harvester machine comprises:
- a disengaging guide, which is adapted to disengage the leg parts of the back half from the carrier of the overhead conveyor, such that the back half is no longer carried by the carrier of the overhead conveyor,
- a saddle conveyor, which is adapted to engage the saddle of the back half and convey it through at least the leg parts harvester machine, optionally also through the saddle meat harvester,
- a groin cutter which is adapted to make an incision in the groin area of the back half between each leg part and the saddle, such that the saddle meat parts remain connected to the saddle,
- a hip dislocating guide which is adapted to dislocate the hip joints,
- a back cutter which is adapted to make an incision between each leg part and the saddle in the back region of the carcass part in such a way that after making the back incision, a tissue connection remains between the each leg part and the saddle part, and
- a leg parts separator, which is adapted to pull the leg parts away from the saddle such that the leg parts are separated from the saddle, in such a way that the saddle meat parts remain connected to the left side and/or right side of the saddle.

24. System according to claim 23, wherein the leg parts separator is adapted to pull the leg parts away from the saddle with a downward pulling.

* * * * *